July 30, 1963
W. NEUBERT
3,099,196
SHUTTER WITH RECIPROCATING SHUTTER
BLADES FOR PHOTOGRAPHIC CAMERAS
Filed July 9, 1959
3 Sheets-Sheet 1
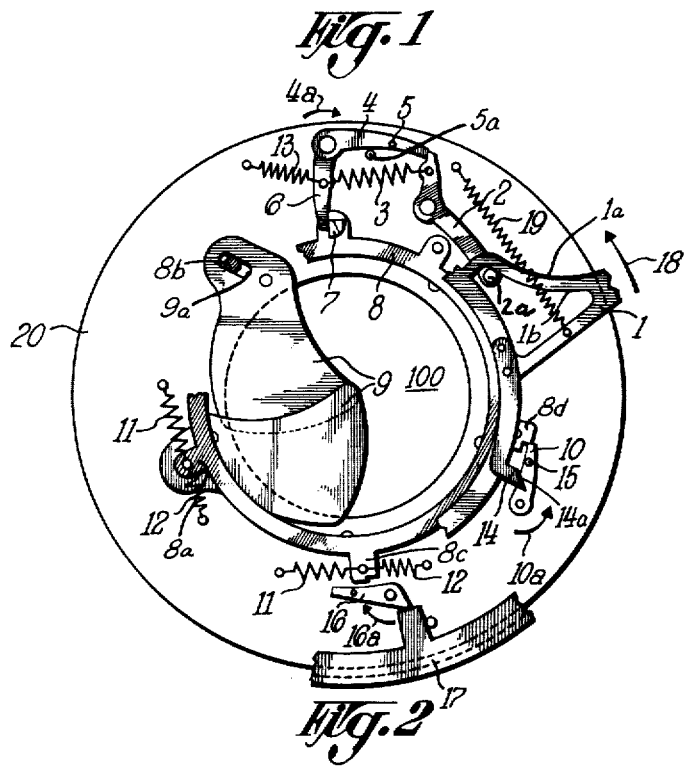
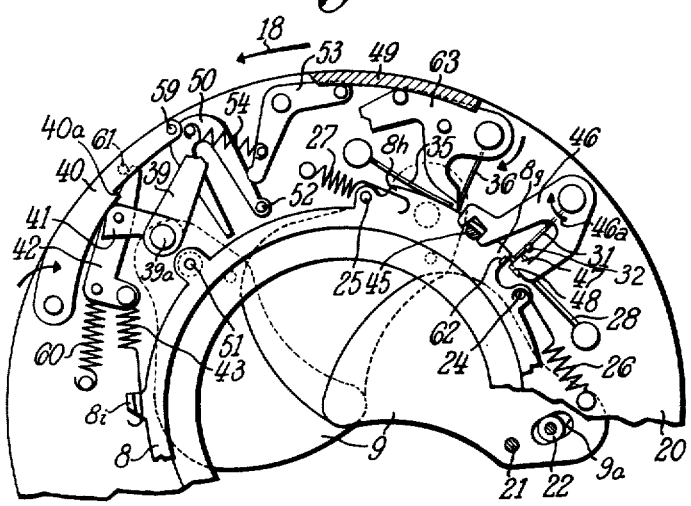
INVENTOR.
WILLY NEUBERT
BY
Attorney

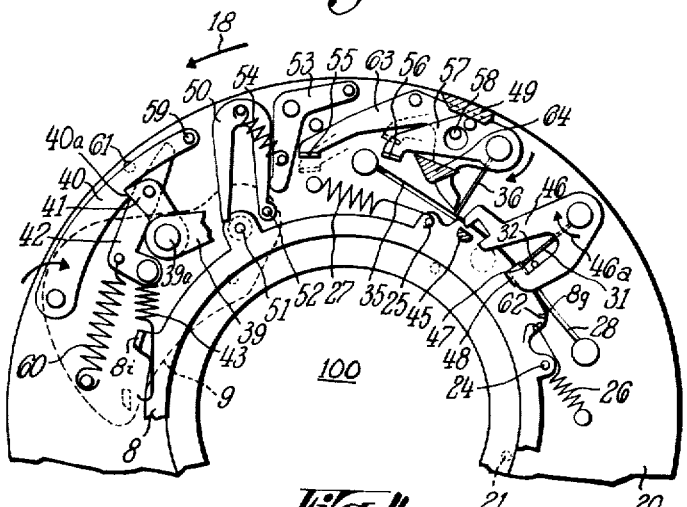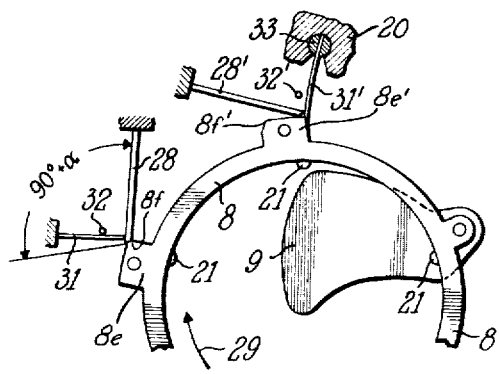

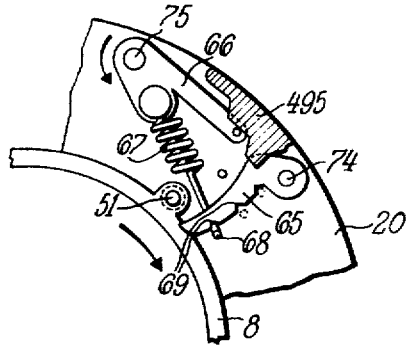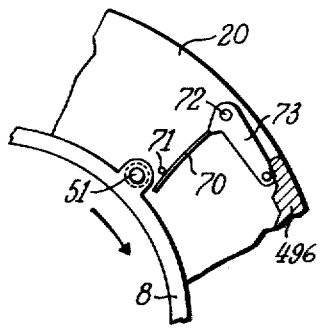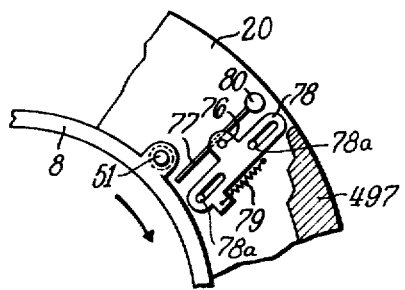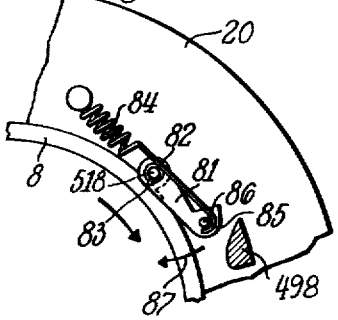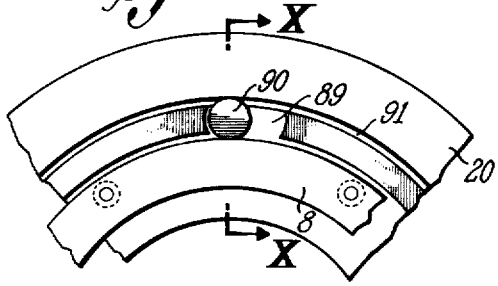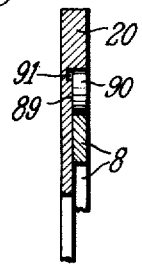
INVENTOR.
WILLY NEUBERT
BY Otto John Munz,
Attorney

United States Patent Office 3,099,196
Patented July 30, 1963

3,099,196
SHUTTER WITH RECIPROCATING SHUTTER
BLADES FOR PHOTOGRAPHIC CAMERAS
Willy Neubert, 29 Herdweg, Gerlingen, near
Stuttgart, Germany
Filed July 9, 1959, Ser. No. 825,923
Claims priority, application Germany July 17, 1958
12 Claims. (Cl. 95—63)

The invention pertains to a shutter with reciprocating shutter blades for photographic cameras.

The prior art shutters of this kind employ springs for the opening and for the closing movements of the shutter blades. It is necessary, however, to supply additional power for the opening and closing movements, so as to overcome the inertia and the friction of the parts to be moved. This transfer of power for each half cycle of the shutter blades, that is, for each of the opening and closing movements, requires a relatively high number of component parts.

The primary object of the invention is to provide a shutter having the smallest number of necessary component parts.

Another object of the invention is to minimize the loss of energy in the shutter in order that the work necessary to cock the shutter be of the lowest possible value. The work must be of such magnitude as to compensate for the energy losses during both the half-swinging movements of the shutter blades.

The primary purpose of this invention is achieved in that the spring forces necessary to move the driving parts for the shutter blades in one of the half-swinging cycles act with a stronger spring force than those of the other half-swinging cycle, and in that the excessive spring force of one half cycle is used to tension the springs which move the shutter blades during the other half and is at least partially delivered and stored in the opposing springs during the cocking of the shutter.

Another object of this invention is to make it necessary to supply the energy only once into the swinging system, namely, when releasing the first half cycle which acts on the stronger spring force. It is immaterial whether the additional energy is supplied to the opening or the shutting of the shutter blades. Before the second half cycle begins, however, the necessary springs already are tensioned during the preceding half cycle. In order to simplify the explanation, it will be assumed that the opening of the shutter blades is being effected with a larger energy than that required for their closing. This invention, however, is not limited to this assumption.

After releasing the shutter, the movement of the shutter blades takes place at a relatively high velocity acceleration. During this movement, or at the end of this movement, the springs are being tensioned which move the shutter blades in the opposite direction at the next half cycle.

The shutter blades are at rest momentarily after a half cycle takes place. At the same time the necessary springs which actuate the following half-swing cycle are tensioned and have stored energy. This energy, less the energy which was lost due to friction of the parts involved during the first half cycle, was stored in the necessary springs before the opening movement. The stored energy for the shutting movement is greater than the energy which is being lost due to friction losses during the closing of the shutter blades. The shutting movement takes place at a relative high velocity and provides a relative high energy for the movement of the shutter blades. The closing movement of the shutter blades may be limited by the use of a stop. In such a case the energy of movement possessed by the shutter blades after the deduction of the friction losses, which occur during the second half swing, is destroying by striking and rebounding at the stop. In order to avoid such a loss, the shutting movement of the shutter blades is not limited by a stop. The end of the shutting movement of the shutter blades is limited by means of springs which store the potential energy. This stored potential energy is being used during the next shutter opening action. Therefore the energy necessary to cock the shutter equals the losses due to friction of the shutter parts. Because of the relative low number of component parts of this invention, the amount of friction and therefore the amount of work necessary to cock can be kept at a low value. With automatic cameras it is of particular importance to keep the necessary cocking work as low as possible.

In a preferred embodiment of the invention an asymmetric spring system, which is independent of the condition of tension of the shutter, engages the driving members of the shutter blades in a manner already explained above. In order to achieve a decreased spring effect, an energy receiving storing spring device is provided which functions in parallel with the weaker spring when the shutter is being tensioned. The spring-storing device is introduced to the first half-sectional cycle in cooperation with the weaker spring, which is independent of the tensioning condition of the shutter, and such an amount of energy is delivered that this half-sectional cycle is carried out with the required high speed and energy impetus.

The stronger spring of the pair, which is independent of the condition of the shutter, is thus entirely tensioned at the end of this movement. Consequently the second half cycle of the shutter swing is accomplished under the influence of this spring, again with the necessary speed, and the excess moving energy at the end of this second half swing is restored into the weaker spring which is similarly independent of the condition of the shutter. Different means may be employed in order to form the asymmetrical springs which are independent of the tensioned state of the shutter. For example, one spring or a plurality of springs can be directed at angles differing for the two motions. Springs of different curvatures may be used for the different motions. The springs which are not dependent on the state of the tensioning of the shutter, as well as those which are dependent on the driving parts of the shutter blades, may be interconnected or may be actuated during the swinging motion.

For ease of manufacturing it is possible to use either one, or a plurality of tension springs with one, or a plurality of compression springs, or to use exclusively either tension or compression springs. There are no special limitations on the shape, size and positioning of the springs, for all practical purposes. When the shutter is designed to store the energy during the tensioning of the shutter at the half-swing cycle during the opening of the shutter blades, a simpler design results than that required when additional energy has to be applied during the closing of the shutter blades. In the latter case the release of stored energy requires special means to permit discharge simultaneously with the shutter, while in the first mentioned case the stored energy can be discharged during the release of the shutter. Thus an undisturbed motion is accomplished, and while using the additional energy values from the first half swing, the motion is very efficient. It is not worth while to attempt to decrease further frictional losses because special expedients, such as used in the construction of sector shutters, would be required.

Another object of this invention is to provide special precautionary measures to influence the spring system which receives and stores the energy from one half cycle and delivers it to the next half cycle. These precautionary measures can be used to regulate the exposure times, without the use of known contrivances which use a higher speed system for the shutter blades to shorten the exposure time.

The speeding up of the shutter blades can be achieved by means described hereinafter. Such means are recommended only with simple shutters in which changes of tension forces are of little importance. Generally a greater shutter blade speed requires a higher tension force.

Another object of the present invention is to regulate the exposure time by changing the spring system which changes the motion energy of the shutter blades. There are mainly two types of means which can be applied for that purpose, either singly or in combination. The first means comprises the step of moving or shifting of the spring system whereby the timing is changed when a drive part of the shutter blades is influenced by the springs so that the timing is being changed as well when the shifting of the spring begins. Another means is in the change of the duration of the spring shifting and the change in the aligning of the spring system which causes the motion of the shutter blades to reverse.

The moment when the shifting of the spring starts cannot be changed by the change of the position of the springs alone but also by means of the assistance of another member.

The duration of the engagement of the spring, and consequently of the directional function of the spring, is controlled by means changing the pretensioning of the spring or the length of its tensioning. In the alternative, springs having variable directional forces may be switched on and off.

Still another object of the invention is to provide a hard spring which may be switched off to achieve the shortest time exposure. To accomplish an extended time exposure, a soft spring is mounted on the housing. By this very simple solution, which requires only two different spring systems acting in opposite directions, a maximum energy saving effect is achieved. When the difference in both the pertinent exposure times is chosen to be great enough, it is quite sufficient and suitable when such exposure times represent a ratio of 1:2.

When constructing such a shutter it is of advantage to start with the longer exposure time, for which the optical efficiency is being fixed. From this point the intermediate speeds of the shutter blades at the opening and closing of the shutter blades will be derived, dependent upon the mass of the shutter parts to be accelerated, upon the energy required for the movement, and upon the soft spring in the housing for changing directions. Similar or equal springs can be used for both directional movements. The only difference is that at the closing due to friction losses the direction angle will be smaller. In such way only one kind of springs would be necessary.

As explained before, the speed of the shutter blades is near constant during the opening and closing actions. The better this assumption is being fulfilled, the more effective it is, because essentially it depends on the energy losses due to friction. This constant speed can be realized so that the shutter parts are accelerated before the opening takes place, that is, while the shutter blades overlap the aperture, and accordingly at the closing, before they start to cover the aperture.

When the motion is being delayed, the following events take place in sequence. It is obvious that the changes of speed are of greater disadvantage with a larger aperture than with a small opening. In order to facilitate the cutting short of the activation of the driving member and the release of the shutter, it is expedient and easy to choose a great enough angle for the action of the springs. In contrast to this, it is advantageous to choose a particularly hard spring for the reverse movement, because after the opening of the shutter blades no shortening is needed and an exposure time half as long is possible in order to increase the optical efficiency. Accordingly, the beginning of the amount of turn depends on the direction of the force of this spring.

In order to achieve the described goals of this invention, it is also necessary to minimize the energy losses which occur during the release of the locked parts. This is achieved by securing the closure with at least two interlocked members. These members are made of leaf springs and are interlocked approximately at right angles. The first leaf spring locks the lock part and the second leaf spring locks the movement of the first locking member. The first lock member rests on top of the closing part with a sliding surface at an angle against the direction of motion which is smaller than the angle of the friction. In this way the first locking member immediately releases the second locking member as soon as the first lock member is unlocked by the second. This first lock member transforms the force at a very negligible value with the help of the sliding surface, this force being needed for the release of the closure. The force which has to be mustered by the second lock member is smaller than the forces which have to be applied directly on the parts to be locked. This force is used to keep the first lock member locked, and therefore, the force which has to be mustered on the second lock member in order to unlock the first lock member is of minimum value.

Further characteristics of this invention result from the following description, from the details of the invention, the claims and the drawings. The individual or several characteristics can be materialized during the execution of the invention.

Other objects and many of the attendant advantages of this invention will be readily appreciated as the same becomes better understood by reference to the following detailed description, when considered in connection with the accompanying drawings, in which like reference numerals designate like parts throughout the figures thereof and wherein:

FIGURE 1 shows a front view of the shutter system of the invention with cover plate removed, with parts broken off for a better view and understanding of the asymmetrical spring arrangement of the drive member of the shutter blades;

FIGURE 2 is a front view of the shutter system of the invention with portions broken off, showing a detailed specific embodiment of the asymmetrical spring arrangement of the drive member and means for additional shifting to achieve a shortened exposure, the shutter blades being shown in closed position;

FIGURE 3 is a front view, similar to that of FIGURE 2, showing the shutter blades in open position with additional release levers for various exposure times;

FIGURE 4 is an enlarged detailed view of means to lock the shutter;

FIGURE 5 is an enlarged sectional view showing a step shaped, movable setting member for the control of the exposure time;

FIGURE 6 is an enlarged sectional view showing means to change the tension for movements of the shutter blades including setting of the exposure time;

FIGURE 7 is an enlarged sectional view of the means to set the tensioning length of the spring which moves the shutter blades;

FIGURE 8 is a sectional view of an alternative embodiment of the means to control the exposure time by change in the spring system acting upon the movement of the shutter blades;

FIGURE 9 is a sectional plan view of a roller bearing detail pertaining to the counting of the shutter blade driving ring; and FIGURE 10 is a cross-sectional view of FIGURE 9 along the lines X—X.

With reference to FIGURE 1, there is a housing 20 upon which is pivotally mounted a plurality of shutter blades 9. The blades 9 are rotatably driven by a blade driving ring 8 which is loosely mounted for rotational movement in both clockwise and counterclockwise directions on the housing 20. Blade ring 8 has for its source of energy a plurality of springs 11 and 12 which are secured at one of their ends to the housing while with the opposite ends are secured to a projection 8a which forms an integral part of the blade ring 8. Springs 11 have a low directional tensional strength when compared to springs 12 which have a high directional tensional strength. Similar springs 11 and 12 act upon a nose 8c to be described hereunder. Springs 11 supply motion to the blade ring in a clockwise direction while springs 12 supply motion in a counterclockwise direction. A spring 3 is a supplemental source of motion for the blade ring in a clockwise direction in a manner to be more fully explained hereinafter.

As shown in FIGURE 1 the shutter blades are in a closed position with the aperture or orifice 100 being completely covered. A tensioning lever or master control member 1 is in a cocked position, the springs 11 and spring 3 are tensioned, and the blade ring 8 is prevented from rotating in a clockwise direction by a locking pawl 10 which is biased in a counterclockwise direction by a spring (not shown) as indicated by an arrow 10a so as to lie against a lip projection 8d of the blade ring 8. When the master control member 1 is tripped (by means not shown), a spring 19, which has been under tension, pulls the master member in a counterclockwise direction, as indicated by an arrow 18. When the master member has moved a short distance, a tapered cam 14 which is mounted on the master member frame contacts, with an upper inclined surface 14a, a pin projection 15 secured to the locking pawl 10 and drives the locking pawl outwardly in a clockwise direction, thus releasing the projection 8d and the blade ring 8 for movement in a clockwise direction through the action of the tensioned springs 11. The cam 14 also has a second inclined surface at its bottom (not visible in FIG. 1), facing the pawl 10. This second inclined surface is arranged in such a manner that the cam 14 is relatively thick in the edge or marginal portion which faces the cam follower pin projection or abutment 15 in the position shown in FIG. 1, while the cam 14 is relatively thin in the opposite marginal portion, i.e., in direction of the reference line and the reference numeral 14.

When the lever 1 is tensioned in a direction opposite to the arrow 18, the cam 14 slides over the abutment 15, due to said second inclined surface, whereby the cam 14 is resiliently lifted above the plane of the drawing of FIG. 1. For this reason, the cam 14 has an elongated portion, similar to a leaf spring, extending parallel to the blade ring 8, to which it is secured by means of two rivets at a relatively large distance from the bent portion which extends radially outside.

An additional source of energy is released at this time by the action of spring 3 which is attached to an intermediate tensioning or locking lever 2 at one end and to a pivotally mounted drive lever 6 at the other. Drive lever 6 is restrained at this point since it abuts a stop 7 located on the blade ring 8. Once the blade ring has been released by locking pawl 10, the drive lever 6 exerts a moving force on the stop 7 through the action of spring 3 and thus drives the blade ring 8 along with the springs 11. The blade ring will then rotate in a clockwise direction and drive the blades 9, similarly in a clockwise direction, to uncover the aperture 100. The connection between the blade ring 8 and the blades 9 is made in a manner well known in the art by pins 8b which are mounted on the blade ring and fit slidably into slots 9a formed in the blades. The blade ring 8 will continue its clockwise movement until all the energy, dissipated (less friction losses) by the springs 11 and spring 3, is stored in the relatively stronger springs 12, at which time the blade ring will move in a counterclockwise direction, driving the blades in a counterclockwise direction to once again close the aperture 100.

While the blade ring is rotating clockwise to open the aperture 100, the master control member 1 continues its counterclockwise rotation until its outer curved cam surface 1a strikes a stop pin 5 secured to a pivotally mounted locking pawl 4. The locking pawl 4 is biased in a clockwise direction by a spring (not shown) as indicated by an arrow 4a and prevents the lever 2 from rotating until after spring 3 dissipates its energy through its action on drive lever 6. When the master control member surface 1a strikes the pin 5, the locking pawl 4 is forced out of engagement with the lever 2 allowing a recovery spring 13, which is relatively weaker than spring 3, to pull the drive lever 6 once again into position to receive the stop 7 upon the counterclockwise rotation of the blade ring 8. It will be noted that when the locking pawl 4 is forced out of contact with the lever 2, this lever is free to move under the action of spring 13 and rides under the locking pawl 4 since a cam follower 2a located on the lever 2 is unimpeded by an inner curved cam surface 1b of the master control member 1 which has moved into position against the pin 5.

Meanwhile the blade ring, driven by springs 12, has rotated in a counterclockwise direction with enough force to drive the projection 8d past the locking pawl 10. The locking pawl 10 then moves counterclockwise to reengage the projection 8d and hold the blade ring in the position shown in FIGURE 1 with the shutter blades once again covering the aperture 100. At this point, the energy dissipated by springs 12 in driving the blade is stored in the relatively weaker springs 11. To store energy in the spring 3, the master control member 1 is rotated clockwise manually, or by other means, until it reaches its locked position where it is held by conventional means not shown. As the master member rotates, the inner cam surface 1b engages the cam follower 2a and rotates the lever 2 clockwise until its upper arm clears the locking pawl 4. At this point the spring loaded locking pawl 4 rotates clockwise and detents against the stop pin 5a, thus preventing the lever 2 from being pulled counterclockwise by the force of spring 3. It is apparent that as the master control member 1 is rotated clockwise, the tapered cam 14 will ride up and over the cam follower pin projection 15 with its second inclined surface, as has been described hereinabove, and slide into position for the next movement of the blades 9. For this purpose the bottom surface of tapered cam 14 is also tapered so as to allow sliding movement over the cam follower pin projection 15. At this point the mechanism is cocked or set for the next rotation of the shutter blades 9 away from and back over the aperture 100.

Means are also provided in the mechanism shown in FIGURE 1 for varying the period of time during which the aperture is exposed. A locking pawl 16 is biased in a clockwise direction by a spring (not shown) as indicated by an arrow 16a and is mounted so as to pivot and engage the nose 8c on the blade ring 8 to restrain said blade ring with the blades 9 drawn away from the aperture 100. A setting means 17 may be conventionally driven by the master control member 1 to disengage the locking pawl 16 from contact with the nose 8c after the aperture 100 has been exposed for a predetermined period of time.

This arrangement is of great advantage over the prior art since the master control member's return to a cocked position is independent of the operation of the shutter blades. Contrary thereto, the prior art utilizes the energy of the master member to open and close the shutter blades as well as to control the exposure time, so that the exposure setting necessarily had to be a function of the operation of the shutter blades.

The shutter of the present invention may also be used in motion picture cameras. In such instances the operation of the tensioning or locking lever 2 and of the locking pawl 10 may be accomplished by motor drive.

It is desirable to reduce the loss of energy in the shutter cycle due to the friction between moving parts, especially in the mechanism which secures and releases the blade ring during various exposure settings. One such method which avoids the use of a complicated linkage with its concomitant high friction losses is illustrated in FIGURE 4. In accordance with the present invention, the locking members are shaped as straight springs with right angle cross section and are resiliently mounted for limited movement. In FIGURE 4 the blade ring 8 is spring loaded in a clockwise direction (by means not shown) as indicated by an arrow 29. A beveled portion 8f is provided on a projection 8e on the blade ring, said beveled portion abutting a locking leaf spring 28. Locking leaf spring 28 is held rigidly against the ring projection 8e by a second leaf spring 31 which abuts the locking spring 28 at right angles.

As shown in FIGURE 4 the angle of inclination of the beveled portion 8f is 90 degrees plus alpha using the locking leaf spring 28 as a reference line. Therefore, once the leaf spring 31 is forced away from contact with locking spring 28, the angle of contact between the locking spring 28 and the blade projection 8e is such that the resilient locking spring 28 will be forced away from contact with the blade ring 8 and the latter will be free to continue in a clockwise direction. Leaf spring 31 is resiliently mounted so that its normal position is one in which it abuts firmly against a stop 32 and is perpendicular to the locking spring 28. The blade ring 8 continues its clockwise rotation and a blade ring projection 8e' having a beveled portion 8f' slides under both a locking leaf spring 28' and a leaf spring 31'. At this point the resilient locking spring 28' drops down into position to abut the returning blade ring projection 8e' and the leaf spring 31' swings into position adjacent a stop 32' and secures the locking spring 28' against rotation away from the blade projection 8e' which has begun to rotate counterclockwise and is thus secured from further rotation by the locking spring 28'. The leaf spring 31' is mounted in a slot in a round member 33 which, in turn, is mounted in a circular recess in the housing 20. By this means a movement of the spring in a longitudinal direction can easily be prevented.

This locking device may be utilized not only in photographic shutters but in any environment where a simple, uniform and lockable release is desired. It may be easily adjusted by corresponding shapes of the inter-related locking members dependent upon the desired use. The advantage of the locking mechanism lies in its ability to release large forces with a relatively low expenditure of energy.

The locking means shown in FIGURE 4 is used to lock the blade ring 8 in both directions of rotation in the embodiment shown in FIGURE 2. The springs 28 and 31 are mounted adjacent a projection 8g in the region of a camming surface 62 of the blade ring 8 and lock the ring against rotation, while a locking leaf spring 35, which is locked by a leaf spring 36, comes to rest on another projection 8h of the blade ring 8 when the closing movement of the ring is being locked.

In FIGURE 2 the invention is shown with shutter blades 9 preset for an exposure time of 1/1000 of a second. The housing 20 pivotally mounts the shutter blades 9 on bearing pins 21. The blade driving ring 8 drives the blades in a conventional manner through the action of cam followers 22 which ride in the slots 9a of the shutter blades 9 and which rotatably transfer the movement of the driving ring to the shutter blades. Pins 24 and 25 are mounted on the driving ring 8 and cooperate with springs 26 and 27, respectively, to impart motion to the ring 8 in both directions. Spring 26 is weaker than spring 27. The other ends of the springs are secured to the housing 20.

In the position shown in FIGURE 2, a U-shaped spring 50 is pivotally mounted on the housing 20 at 52. An intermediate two-armed lever 53 is also pivotally mounted on the housing 20 and is attached to the spring 50 by means of a spring 54. When a setting member 49 is moved over the upper arm of the lever 53 and said lever is moved clockwise around its pivot point and the lower arm is forced against the spring 50, it drives the spring 50 counterclockwise in such a manner that the spring is set in the path of a stop 51 located on the driving ring 8. When the spring 50 is swung into the path of stop 51, the shutter is set for the shortest exposure time. Shortly after the shutter blades 9 open to uncover the aperture 100, the stop 51 makes contact with the spring 50 which is flexed as a result of the force applied and receives a certain amount of potential energy. During this rotation of blade ring 8, the spring 27, which may be identical with spring 12 in FIGURE 1, is tensioned and receives a certain amount of potential energy which will be utilized along with the energy stored in spring 50 to drive the blade ring 8 in a counterclockwise direction, so as to close the shutter blades 9 over the aperture 100. During the counterclockwise rotation of the blade ring, the spring 26 is again tensioned until finally the locking spring 28 again enters into a locking position against the blade ring projection 8g. In such a manner the spring 50 shortens the length of rotation of the shutter blades so that the blades just clear the aperture and then are returned to a closed position under the influence of springs 27 and 50.

As shown in FIGURE 3, the U-shaped spring 50 may be swung out of the path of contact of the stop 51 by the setting member 49 for all other exposure times. The very hard spring 50 comes into engagement only during the exposure time of 1/1000 of a second while otherwise the change in movement is caused by spring 27 alone, whereby the shutter blades swing out fully. The return of the blade ring 8 during the shortest exposure time of 1/1000 of a second may be accomplished by spring 50 alone without the co-action of spring 27.

To cock or set the shutter apparatus, master control member 1 (not shown in FIGURES 2 and 3), is rotated clockwise in a manner similar to that described in connection with FIGURE 1, in a direction opposite to the arrow 18. Attached to the master member is an arm 39 which is pivoted about a pivot point 39a thus pivoting in a clockwise direction an arm 41 which is rigidly affixed to arm 39 so that the arm 39 slides along the lower surface of a lever 40 and engages said lever at a recessed portion 40a, as shown in FIGURE 3, and is locked against counterclockwise rotation. Arms 39 and 41 together form a two-armed lever. Arm 41 is secured to a link 42 which is, in turn, connected to springs 43 and 60. A limit stop 61 is provided for controlling the counter-clockwise rotation of link 42. Spring 43 is relatively stronger than spring 60 and its opposite end engages a stop projection 8i on the blade ring 8. As the arm 41 is pivoted clockwise under the influence of the master control member 1, it carries the link 42 which, in turn, tensions the spring 43 which has abutted against the projection 8i. A stop 45 is mounted on the master control member and the clockwise rotation of the master control member 1 moves the stop 45 against a spring-loaded lever 46, moving said lever counterclockwise and securing it against movement in the opposite direction.

The sequence of operation is similar to that shown in FIGURE 1. The master control member 1 is tripped and the spring 19 pulls the master member in a counterclockwise direction. The stop 45 disengages the lever 46, allowing said lever to rotate clockwise around its pivot point. A stop 47, located on the lever 46, frees the locking spring 28, allowing the blade ring 8 to rotate and uncover the aperture 100. The lever 46 also carries a slanting stop 48 which serves to lift the lever by action of the blade ring 8 so that the stop 47 is higher than and clears the leaf spring 31. Thus the lever 46 is free to rotate in the direction indicated by an arrow 46a on effect of a biasing spring (not shown). At the same time the master control member continues in a counterclockwise direction and engages the lever 40 at a pin 59, forcing said lever out of contact with the arm 41. The arm 41 is then free to move counterclockwise under the influence of the weak spring 60 and will remain free until it is cocked again by the master control member 1 for the next shutter blade movement. When the shutter blades have completely uncovered the aperture, the energy dissipated by springs 26 and 43 will be stored in spring 27 (and spring 50 for the short exposure), and the spring 27 will reverse the rotation of blade ring 8, closing the blades over the aperture. Projection 8g on the blade ring 8 will then be secured against counter rotation by locking spring 28 which in turn is held stationary by the perpendicular action of leaf spring 31.

During all other exposure settings with the exception of $\frac{1}{1000}$ of a second, when the U-shaped spring 50 is used, the blade ring 8 is held momentarily with the shutter blades 9 open. This momentary inaction is brought about by the engagement of blade ring projection 8h with the locking spring 35 which is held in an abutting relationship with the projection 8h by leaf spring 36.

As shown in FIGURE 2, a lever 63 is momentarily held away from the leaf spring 36 by the setting member 49 when the exposure setting is $\frac{1}{1000}$ of a second. For other settings, however, lever 63 is freed from contact with the setting member 49 so that the leaf spring 36 is free to hold the locking spring 35 firmly against the blade ring projection 8h, as shown in FIGURE 3. Thereby the return motion of the shutter blades is locked for such a time until lever 63 swings out against the leaf spring 36. The swinging out of the lever 63 is accomplished by a stop 64, as shown in FIGURE 3, which is mounted on the master control member 1, said stop 64 moving counterclockwise to the master control member during the opening portion of the shutter cycle.

The speed of master control member 1 is such that an exposure time of $\frac{1}{125}$ of a second is created when the stop 45 contacts a lug 55 on lever 63, which in turn frees the blade ring in the manner set forth hereinbefore.

When, as shown in FIGURE 3, the exposure time of $\frac{1}{250}$ of a second is preset by the setting member 49, a lug 56 is positioned in the path of the master control member stop 64, the lug 56 being attached to a lever 57. The actuation of the lever 57, by the action of stop 64 against lug 56, results in the swinging out of the lever 63 by the lever 57 through a connection 58 mounted on the lever 63.

The relative strength of the drive springs 26 and 27 is such that spring 27 is stronger to allow for energy losses due to friction in the system. However, this energy loss is replaced at the end of each shutter cycle by the resetting of the master control member 1 which reactivates spring 43 to assist spring 26 in driving the blade ring 8 to open the shutter blades. To decrease the friction, it is useful to arrange the springs which cooperate with blade ring 8, particularly springs 26 and 27, and the U-shaped spring 50, symmetrically in several directions, for instance, in pairs so that two identical springs functioning in the same direction are facing each other. The motive energy is collected elastically during the opening and closing of the shutter blades and therefore there is little axial load on the driving pins of the shutter blades, so that the frictional losses may be decreased by using smaller pin diameters. The transfer of power from the blade ring to the shutter blades may be accomplished by roller cam followers, thus reducing still further the frictional energy loss.

Instead of the symmetrical arrangement of the springs engaging the blade ring, single springs may be utilized when the blade ring is mounted for rotation on rollers, as is illustrated in FIGURES 9 and 10. For this purpose the housing portion 20 has slots 89 in which are mounted rollers 90. The circumference of the blade ring 8 rolls over the rollers 90. A deeper secondary slot 91 is cut circumferentially into the housing 20 in order to prevent collection of dust in the path of rollers 90.

It is also unnecessary to mount the master control member 1 on a ring rotatable about the axis of symmetry of the aperture, as in the case of the described, preferred embodiment. Other methods of mounting may be utilized.

FIGURES 5-8 show several optional means for influencing the return spring 27 for setting the various exposure times. These various possibilities are meant only to show the possibility of modification of the basic novel concept.

The exposure-time setting member 495 shown in FIGURE 5 is movably mounted in the housing and is stepshaped. The several steps swing an angular link lever 66 around a bearing 75. On lever 66 there is mounted a spring 67 having a free end provided with a hook 68 which engages a lever 65 pivotally mounted on a pin 74. The end of lever 65 is in the path of the stop 51 of ring 8. The lever 65, on its rim which engages the inner side of the hook 68, engages one of the notches 69 of lever 65, which is closer or farther from the rotational point 74. Corresponding to the engagement in these various notches, the effective length of the lever arm 65 is different, and therefore the movement which the stop 51 has to overcome by the swinging of the lever 65 varies. Consequently, the directional return force of the arrangement is different for each notch setting and therefore the toughness of the spring and the length of the playing out of the spring during the return motion of the shutter blades will vary the exposure setting.

When the three notches 69 of the lever 65 swing around the axis of pin 74, the stop 51 hits the end of the lever 65 in each swinging position of the lever 66 at the same place and, therefore, the braking of the shutter blades always begins at the same opening angle. This, however, is not the case when the hook 68 is arranged at a different spacing from the pin 74. By proper selection of this spacing it is therefore possible to determine, during the various exposure times, at which opening angles the braking of the shutter blade motion should begin; with hard springs, for instance it should be later than with a soft spring setting.

In FIGURE 6 means are shown to set the exposure time by changing the tensioning of a spring 70 which returns the motion of the shutter blades. Again a stepped setting member 496 is provided which cooperates with a lever 73 which is pivotally mounted on a pin 72 and which carries the return spring 70 controlling the motion of the shutter blades. The spring 70 is adjacent to a stop 71. The free end of spring 70 is in the path of stop 51 which lifts the spring 70 from stop 71, and stop 51 is thrown back thereby. Thus the time required to return the motion is dependent upon the pretensioning of the spring 70 by the setting member 496.

In FIGURE 7 presenting means are shown for the length of tensioning a spring 77 which returns the motion of the shutter blades. Contrary to the illustrattion in FIGURE 6, where the return spring 70 is shown on the side of the stop 71 away from the stop 51, in FIGURE 7 the leaf spring 77 is arranged on the side of a stop 76 nearest the stop 51. The spring 77 is secured at one end to a member 80. The stop 76, again contrary to the showing of FIGURE 6, is arranged here along the inoperative position of the leaf spring 77 by means of a reciprocable member 78 which is movable along guides 78a fixedly arranged in the housing. During the exposure time, this member 78 is moved against the influence of a spring 79 by a setting member 497. Instead of a stop 76 adjacent to one side of spring 77, a guide path may be provided for an extended section for the spring 77 so that the spring section between the guide responding to stop 76 and the tensioning position 80 of the spring does not swing when the stop 51 engages the free end of the leaf spring 77. The directional force and the spring path of the spring which effects the return of the shutter blades may be the change in the setting length.

A variation of the method of changing the exposure time by changing the springs actuating the return movement of the shutter blades is shown in FIGURE 8. A lever 81 is mounted on the drive ring 8 on an axis 82 forming a stop 518. A stop 83 is mounted on axis 82. The stop 83 engages a corresponding nose of lever 81 which is under the influence of a spring (not shown). The stop 83 is held in position as shown in FIGURE 8. A switching spring 84 which effects the reversal of movement of lever 81 is mounted with one end fixed to the housing 20 while the other end is provided with a hook 85. The lever 81 has on its free end a stop 86 in the path of which is the hook 85. The lever 81 is swingable out of the path of the hook-shaped spring end 85 against the effect of a traction spring (not shown) the pulling direction of which is shown by an arrow 87. This is accomplished by a slidable setting member 498 which may be pushed in such a way into the path of the latter that the lever 81 may be swung in the direction of arrow 87 prior to the engagement of stop 86 with hook 85.

The drive ring 8 in this case continues running until stop 518 formed by axis 82 is caught by the hook 85 of spring 84. Thereby the drive ring 8 is forced to return sooner when the setting member 498 is outside of the path of lever 81, and the stop 86 is engaged by hook 85. To obtain an extended exposure time, the setting member 498 swings away the lever 81, the setting member extending in the path of this lever. This occurs prior to the time when stop 86 reaches hook 85 so that first the stop 51 is caught in the hook 85 and, in turn, initiates the reversal of the movement.

Although the preferred embodiments of the device have been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

I claim:

1. A photographic objective shutter comprising an apertured housing, at least one shutter blade mounted on said housing for rotation into aperture opening and closing positions, a first and a second spring connected to said housing and to said shutter blades for biasing the latter to said opening position by said first spring and to said closing position by said second spring, the latter being stronger than said first spring, said first and said second springs being reciprocably tensioned by each other during the respective biasing actions, releasable stored energy means selectively connectable in aiding relationship to said first spring, means to connect said stored energy means to said first spring before the biasing action of the latter so that when aided by said stored energy means said first spring has a greater force than said second spring, and means to disconnect said stored energy means from said first spring before the biasing action of said second spring, said springs and said stored energy means being effective during the entire respective opening and closing movements of said shutter blades.

2. A photographic objective shutter according to claim 1 wherein said disconnecting means includes an intermediate lever pivotally mounted on said housing, further including a ring member rotatably mounted on said housing and connected to said shutter blades for rotation thereof, a tensioning lever shiftable in said housing and adapted to control a cam portion of said intermediate lever, and a relatively weak tensioning spring for urging said tensioning lever out of its cocked position while said shutter blades are being released, said connecting means being adapted to lock said intermediate lever against release, said stored energy means being connected between said intermediate lever and said connecting means.

3. A photographic objective shutter according to claim 2, wherein said connecting means includes a rotatably mounted pawl having a drive lever arm in contact with said ring member in said closing position and being in engagement with an end portion of said intermediate lever opposite said cam portion, said stored energy means being connected to said intermediate lever and said drive lever arm, said pawl having a pin projection for engaging said tensioning lever at the end of its release path whereby said pawl is brought out of engagement with said intermediate lever.

4. A photographic objective shutter according to claim 1, further including a ring member rotatably mounted on said housing and connected to said shutter blades for rotation thereof, an intermediate lever pivotally mounted on said housing and in operative engagement with said connecting and said disconnecting means, a tensioning lever shiftable in said housing for controlling the motion of said intermediate lever, and actuating means for releasing said shutter blades to said opening position, said actuating means including a lip projection on said ring member, a locking pawl on said housing for engagement with said lip projection to prevent said ring member from moving towards said opening position, a pin projection on said locking pawl, and a resilient cam secured to said tensioning lever adapted, upon shifting of said tensioning lever, to engage said pin projection and to disengage thereupon said locking pawl from said lip projection, releasing thereby said shutter blades.

5. A photographic objective shutter according to claim 1, further including a ring member rotatably mounted on said housing, said shutter blades being operatively connected to said ring member, means for regulating said biasing action of the second spring, stop means on said ring member adapted to be engaged by said regulating means, and presetting means for controlling the action of said regulating means according to predetermined exposure time settings, whereby the time interval between said aperture opening and closing positions is optionally variable for the objective shutter.

6. A photographic objective shutter according to claim 5, wherein said regulating means comprises a first and a second lever pivotally mounted in said housing, and spring means attached to said first lever and selectively engaging one of at least two notches in said second lever, said second lever protruding with its free end into the path of said stop means, and wherein said presetting means comprises a slidable, stepped setting member in operative engagement with said first lever, whereby the angular positioning of said first lever by said setting member controls the effective length of said second lever in said biasing action of the second spring by the intermediary of said stop means.

7. A photographic objective shutter according to claim 5, wherein said regulating means comprises a lever pivotally mounted on said housing, spring means attached to said lever and protruding with its free end into the path of said stop means, and a fixed stop mounted on said housing in the proximity of said free end at its side closer to said stop means, and wherein said presetting means comprises a slidable, stepped setting member in operative engagement with said lever, whereby the pretensioning of said spring means by said setting member controls said biasing action of the second ring by the intermediary of said stop means.

8. A photographic objective shutter according to claim 5, wherein said regulating means comprises spring means attached to said housing and protruding with its free end into the path of said stop means, and a reciprocable member having a portion in selective frictional engagement with said spring means on its side turned away from said stop means, and wherein said presetting means comprises a slidable, stepped setting member in operative engagement with said reciprocable member, whereby the free portion of said springs means is altered by said setting member through said reciprocable member, controlling thereby said biasing action of the second spring by the intermediary of said stop means.

9. A photographic objective shutter according to claim 5, wherein said regulating means comprises a lever pivotable on said ring member about the axis of said stop means, and spring means pivotally mounted on said housing and having a hook on its free end, said lever having at its end a stop falling into the path of said hook, and wherein said presetting means comprises a slidable setting member in operative engagement with said end of the lever, whereby the latter can be optionally swung out of said path of the hook in which case the reversal of movement of said ring member towards said closing position is delayed, while said biasing action of the second spring is increased if said stop is caught by said hook.

10. A photographic objective shutter according to claim 1, further including a ring member rotatably mounted on said housing and connected to said shutter blades for rotation thereof, and master control member means including a movable setting portion, said stored energy means being connected to said setting portion and actuable upon movement thereof.

11. A photographic objective shutter according to claim 10, wherein said disconnecting means includes an intermediate tensioning lever pivotally mounted on said housing, said connecting means includes a rotatably mounted locking pawl having an arm holding a portion of said tensioning lever against release and a pivotable drive arm in contact with said ring member in said closing position, and wherein said stored energy means includes a spring connected between said tensioning-lever portion and said drive arm.

12. A photographic objective shutter according to claim 11, wherein said setting portion includes a movable member connected to said tensioning lever and effective to rotate said portion of the latter so as to tension said spring.

References Cited in the file of this patent

UNITED STATES PATENTS

| 1,626,032 | Fairchild | Apr. 26, 1927 |
| 2,197,284 | Wooster | Apr. 16, 1940 |
| 2,487,733 | Sheffer | Nov. 8, 1949 |
| 2,925,763 | Venning | Feb. 23, 1960 |
| 3,002,441 | Noack | Oct. 3, 1961 |

FOREIGN PATENTS

| 764,480 | Great Britain | Dec. 28, 1956 |

UNITED STATES PATENT OFFICE
CERTIFICATE OF CORRECTION

Patent No. 3,099,196                         July 30, 1963

Willy Neubert

It is hereby certified that error appears in the above numbered patent requiring correction and that the said Letters Patent should read as corrected below.

Column 12, line 68, for "ring" read -- spring --.

Signed and sealed this 25th day of February 1964.

(SEAL)
Attest:
ERNEST W. SWIDER                         EDWIN L. REYNOLDS

Attesting Officer                      Acting Commissioner of Patents